United States Patent [19]

Mackey

[11] Patent Number: 4,674,982
[45] Date of Patent: Jun. 23, 1987

[54] EDUCATION DEVICE

[76] Inventor: Harold M. Mackey, 2742 Park Street, Regina, Saskatchewan, Canada, S4N 2H5

[21] Appl. No.: 831,812

[22] Filed: Feb. 24, 1986

[30] Foreign Application Priority Data

Mar. 29, 1985 [CA] Canada ................................. 477961

[51] Int. Cl.[4] .............................................. G09B 1/40
[52] U.S. Cl. ..................................... 434/188; 40/450; 434/160
[58] Field of Search ............... 434/188, 189, 199, 202, 434/405, 160; 40/450

[56] References Cited

U.S. PATENT DOCUMENTS

| 713,638 | 11/1902 | Hepfinger | 434/160 |
| 2,611,193 | 9/1952 | Davis | 434/196 |
| 4,220,948 | 9/1980 | Trame | 40/450 X |
| 4,539,768 | 9/1985 | Halliday | 40/450 X |

FOREIGN PATENT DOCUMENTS 694042  7/1953  United Kingdom ................ 434/160

Primary Examiner—William H. Grieb
Attorney, Agent, or Firm—Stanley G. Ade

[57] ABSTRACT

Blocks of three different shapes can be detachably secured to a supporting surface such as a board and can form numbers from 0 to 9 inclusive in digital format.

16 Claims, 18 Drawing Figures

EDUCATION DEVICE

BACKGROUND OF THE INVENTION

This invention relates to new and useful improvements in educational games in which a plurality of blocks can be arranged on a base to form digital type numbers. Digital type numbers are numbers similar to those formed with light emitting diodes which, when all bars are illuminated, form a figure 8 having a substantially rectangular configuration with the remaining numbers from 0 through 9 being formed of a plurality of the straight bars being illuminated depending upon the number being displayed.

Although the device is primarily designed as an educational game, nevertheless it will be appreciated that the same principle can be utilized in other environments such as, for example, the formation of desired house numbers and the like.

SUMMARY OF THE INVENTION

When used as an educational game, it is desirable that the blocks be placed upon a substantially rectangular base having a raised border to retain or assist in positioning the individual blocks with means also being provided cooperating between the under side of the blocks and the supporting surface to detachably secure the individual blocks in the desired position to form the preferred number 0 through 9 inclusive.

In accordance with the invention there is provided an educational game comprising in combination a planar base, a plurality of shaped blocks detachably securable to said base and means to secure a selection of said blocks to said base to form digital type numbers from 0 to 9 inclusive.

In accordance with another aspect of the invention, there is provided a set of blocks for forming digital numbers from 0 through 9 inclusive, each set including at least three types of individually shaped blocks, an upper and lower transversely situated block (2 off), a centrally located transversely situated block (1 off), and a side vertically situated block (4 off).

Another advantage of the educational game is that children for example, can readily be taught the numbers 0 through 9 inclusive in digitized form by rearranging the set of blocks upon the base to form the desired number.

Another advantage of the invention is to provide an educational game of the character herein described which is simple in construction, economical in manufacture and otherwise well suited to the purpose of which it is designed.

With the foregoing in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention, in which:

DESCRIPTION OF THE DRAWINGS

In the drawings like characters of reference indicate corresponding parts in the different figures.

DETAILED DESCRIPTION

Figure 1:
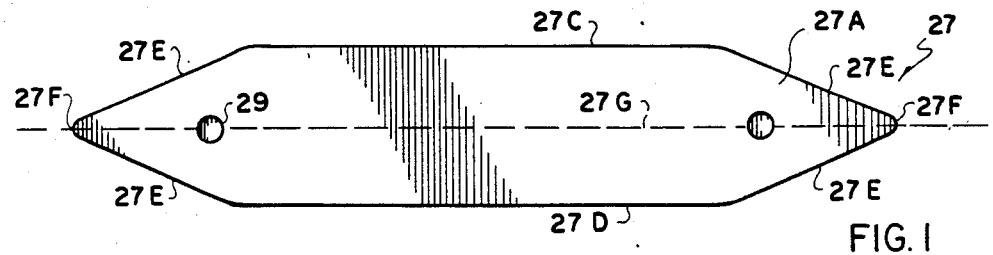
FIG. 1 is an under side view of a centrally located transversely situated block.
Figure 2:
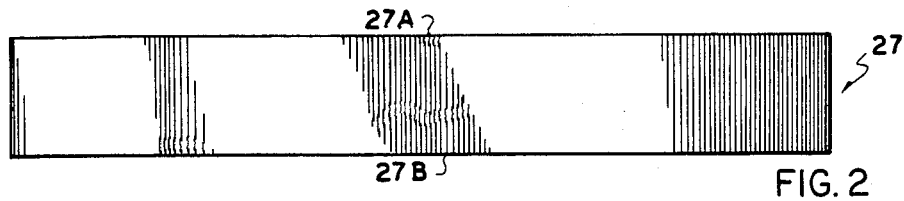
FIG. 2 is a side view of FIG. 1.

Proceeding therefore to describe the invention in detail, reference must first be made to FIGS. 7 and 8 which show a substantially rectangular board or supporting surface collectively designated 20 consisting of a planar surface 21 having raised edges 22 formed therearound and a plurality of upwardly extending projections 23, the purpose of which will hereinafter become apparent.

These projections take the form of substantially cylindrical pegs 24 secured to the surface of the board 21 and having an upper end 24 slightly chambered as indicated by reference character 25. The numbers 0 through 9 may be formed from a plurality or set of blocks illustrated in FIGS. 1 through 6.

Each set consists of three individually shaped types of blocks, namely, an upper and lower horizontally situated block collectively designated 26, a centrally located horizontally situated type of block collectively designated 27 and a side vertically situated type of block collectively designated 28.

All of the blocks, in this embodiment, are of a substantially rectangular cross section or configuration. In detail, the upper and lower horizontal blocks 26 include a first or upper horizontal surface or face 26A, a second or under side horizontal face or surface of similar configuration 26B situated in spaced and parallel relationship to the first horizontal face 26A. This block also includes a first or outer vertical surface of face 26C and a second or inner spaced and parallel vertically situated face 26D.

Figure 3:
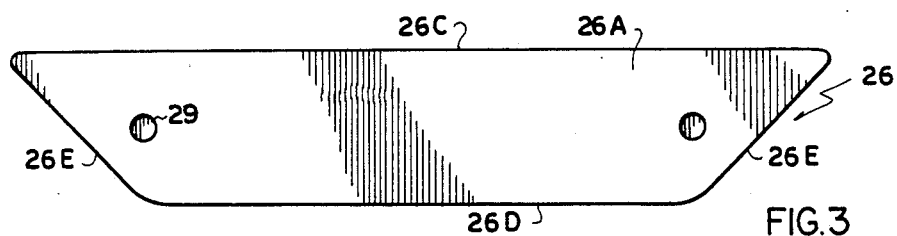
FIG. 3 is an under side plan elevation of an upper or lower transversely situated block.
Figure 4:
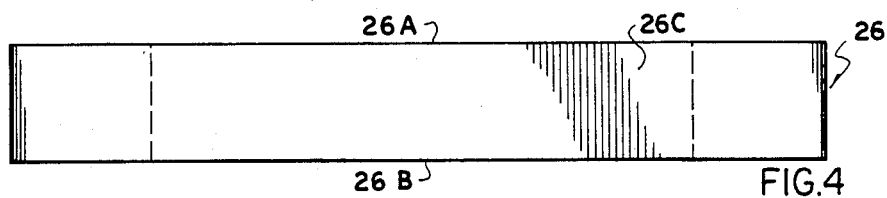
FIG. 4 is a side elevation thereof.

The length of the first vertical face 26C is greater than the length of the second vertical face 26D and the ends 26E angulate inwardly at a similar angle from the ends of the first vertical face 26C towards the ends of the second vertical face 26D as clearly shown in FIG. 3.

The centrally located transversely situated block 27 includes a first horizontal face 27A, a second horizontal face 27B in substantial spaced and parallel relationship to face 27A. It also includes a first vertical face 27C and a second spaced and parallel vertical face 27D. The length and configuration of both of the horizontal surfaces 27A and 27B and of the vertical faces 27C and 27D, are similar so that the ends of the block 27 when viewed in plan, coverage to a common locus 27F lying on the central longitudinal axis 27G of the block.

Figure 5:
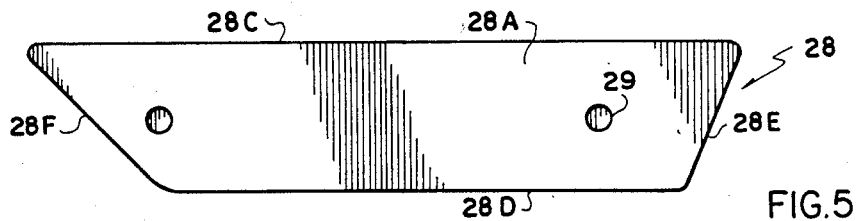
FIG. 5 is an under side view of a side vertically situated block.
Figure 6:
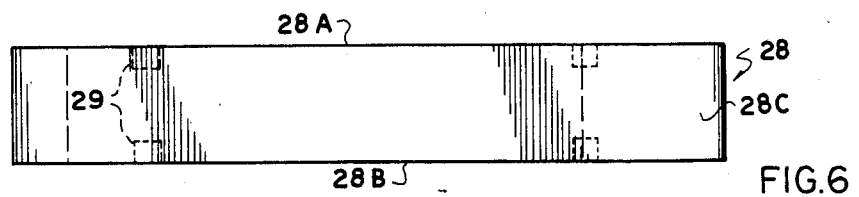
FIG. 6 is a side elevation thereof.

The side vertically situated blocks 28 shown in FIGS. 5 and 6 include a first horizontal face 28A, and a spaced and parallel horizontal face 28B. Also included is a first vertical face 28C and a second spaced and parallel vertical face 28D.

The vertical face 28C is longer than the vertical face 28D and the ends 28E and 28F of the block incline or angulate inwardly from the ends of the vertical face 28C to the vertical face 28D at a different angle as clearly shown in FIG. 5 with the angle of the face 28E being greater than the angle of the face 28F when compared to the longitudinal axis of the block.

Figures 7, 8:
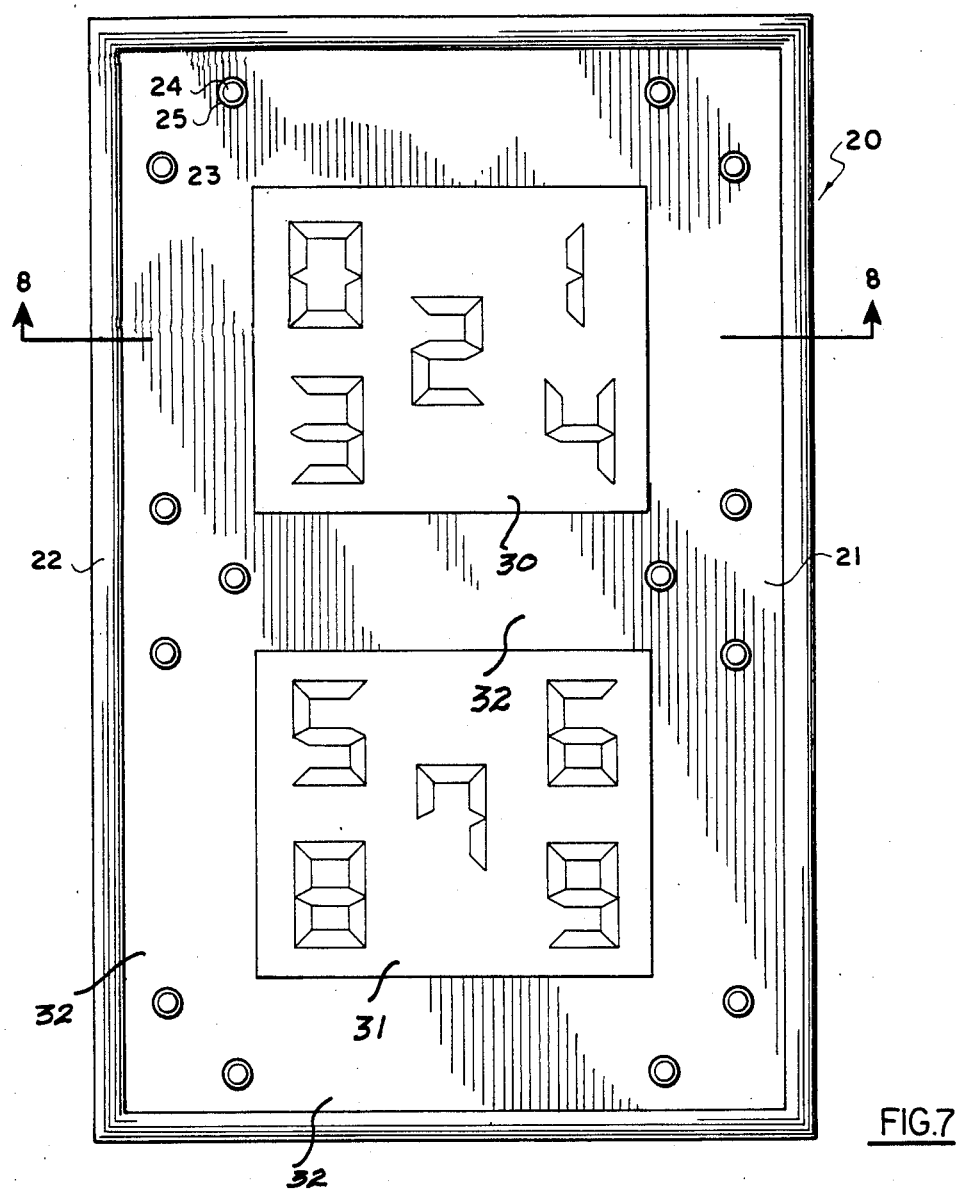
FIG. 7 is a top plan view of a supporting surface or board.
FIG. 8 is a section substantially along the line 8—8 showing one of the upper transversely situated blocks about to be engaged with the board.
Figure 9:
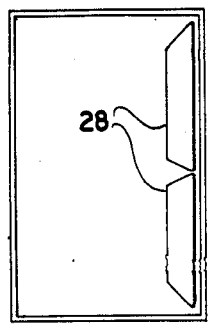
FIGS. 9 through 18 inclusive are schematic views of the invention showing how the blocks may form the numbers 0 through 9 inclusive.
Figure 10:
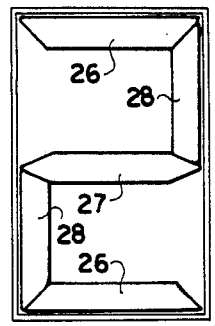
Figure 11:
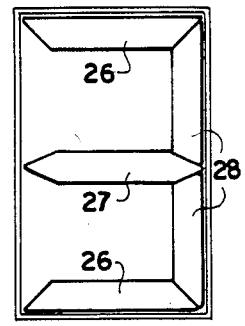
Figure 12:
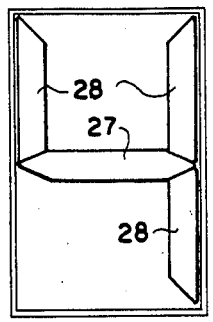
Figure 13:
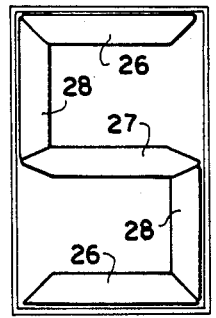
Figure 14:
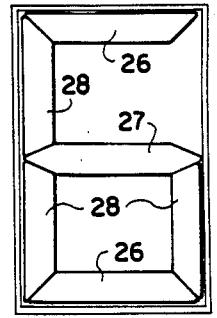
Figure 15:
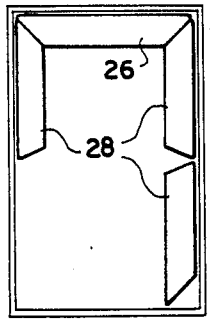
Figure 16:
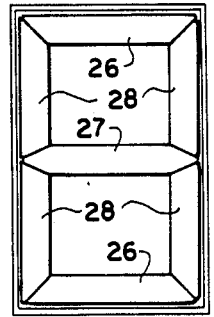
Figure 17:
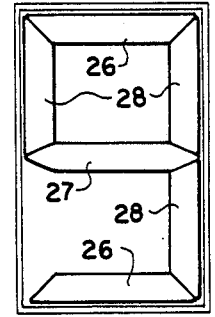
Figure 18:
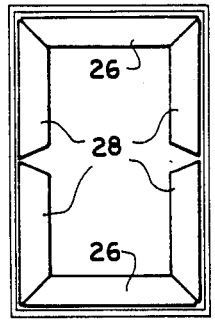

As will become apparent, from a perusal of FIG. 16, the numeral requiring the largest number of blocks is the FIG. 8 which includes two blocks similar to block 26, an upper block and a lower block, one horizontally situated central block similar to block 27, and four side vertical blocks similar to the block 28.

In order to form the rectangular type numbers, it will be seen that the vertically situated blocks are positioned with the end 28F (substantially 45 degrees) abutting against the similarly angled ends 26E of blocks 26 whereas the more acutely angled ends of the central horizontal block 27, engage the more obtuse angled ends 28E of the side vertical blocks.

This means that these vertically situated blocks are formed with either two right handed and two left handed forms or, alternatively, the blocks are capable of being turned over to form the opposite handed blocks required on the left or right vertical sides of the frame.

Means are provided to detachably secure the individual blocks in the desired position upon the base 21 of the frame 20 and in the present embodiment, this includes the pins or pegs 23 which cooperate with drillings or bores 29 formed in the first horizontal faces 26A, 27A, and 28A of the three different type of blocks.

Under these circumstances two left and two right handed blocks 28 will be required. This enables all numbers from 0 through 9 to be formed by positioning the blocks upon the board and engaging the apertures of the individual blocks over the chamfered pegs 23 which are positioned substantially as shown in FIG. 7.

Alternatively, the four blocks 28 may be provided with blind apertures or bores on both horizontal faces as shown in phantom in FIG. 6 thus enabling same to be used either left or right handed as desired thus eliminating the necessity of sorting the blocks 28.

It will of course be obvious that, if desired, other means of detachably securing the blocks to the board may be provided. One such obvious alternative is to provide pegs such as 23 on the first horizontal surfaces of the block in place of the apertures and to form the apertures within the horizontal surface 21 of the board.

Other such means as magnetic attachments may of course be utilized, and this is believed to be within the scope of the invention.

It will also be appreciated that similarly shaped blocks may be used to form house numers or a like under which circumstances the blocks may either be adhesively secured to the vertical surface of the siding or the like, or alternatively, screws or nails may engage through apertures such as 29 formed clear through the blocks.

It will therefore be appreciated that the game is provided which is suitable for use by children, or retardates or other handicapped individuals in order to train them or teach them the basic numbering system.

It will also be appreciate that the maximum number of pieces required to form any of the individual numbers 0 through 9 is two blocks similar to block 26, one similar to block 27 and four similar to block 28.

Finally, it is desirable that two rectangular raised portions 30 and 31 may be secured to or formed on the board surface 21 as shown in FIG. 7 thus defining channels 32 between the sides of the blocks 30 and 31 and the sides 22 of the board or between the adjacent blocks 30 and 31. These channels are very slightly wider than the width of the blocks 26, 27, and 28 and thus facilitating the engagement of the blocks onto the board.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. An educational game comprising in combination a planar base, a plurality of shaped blocks detachably securable to said base and means to secure a selction of said blocks to said base to form digital type numbers from 0 to 9 inclusive, said blocks including at least three individually shaped blocks, an upper and lower transversely situated block, a centrally located transversely situated block and a side vertically situated block, said upper and lower transversely situated block being of a substantially rectangular cross sectional configuration having a first horizontal face and a second spaced and parallel horizontal face, and a first vertical face and a substantially spaced and parallel second vertical face, said first vertical face being longer than said second vertical face, the ends of said block angulating inwardly at a similar angle from the ends of said first vertical face to the ends of said second vertical face thereby defining a trapezoid.

2. The invention according to claim 1 in which said means include projections upstanding from said base and apertures in at lease one face of said blocks engagable with said projections.

3. The invention according to claim 2 in which each of said centrally located transversely situated blocks is of a substantially rectangular cross sectional configuration and includes a first horizontal face and a spaced and parallel second horizontal face, a first vertical face and a spaced and parallel second vertical face, said first vertical face and said second vertical face being of similar length, the ends of said block, when viewed in plan, converging to a common loci lying on the central longitudinal axis of said block, the distance between said common loci being greater than the length of said first and second vertical faces.

4. The invention according to claim 1 in which said side vertically situated block is of a substantially rectangular cross sectional configuration and has a first horizontal face and a spaced and parallel second horizontal face, a first vertical face and a substantially spaced and parallel second vertical face, said first vertical face being longer than said second vertical face, the ends of said block angulating inwardly from the ends of said first vertical face to the ends of said second vertical face at different angles to one another.

5. The invention according to claim 4 which includes at least two upper and lower transversely situated blocks, at least one centrally located transversely situated block and at least four side vertically situated blocks.

6. The invention according to claim 3 which includes at least two upper and lower transversely situated blocks, at least one centrally located transversely situated block and at least four side vertically situated blocks.

7. The invention according to claim 2 in which said side vertically situated block is of a substantially rectangular cross sectional configuration and has a first horizontal face and a spaced and parallel second horizontal face, a first vertical face and a substantially spaced and parallel second vertical face, said first vertical face being longer than said second vertical face, the ends of said block angulating inwardly from the ends of said first vertical face to the ends of said second vertical face at different angles to one another.

8. The invention according to claim 7 which includes at least two upper and lower transversely situated blocks, at least one centrally located transversely situated block and at least four side vertically situated blocks.

9. The invention according to claim 2 which includes at least two upper and lower transversely situated blocks, at least one centrally located transversely situated block and at least four side vertically situated blocks.

10. The invention according to claim 1 in which each of said centrally located transversely situated blocks is of a substantially rectangular cross sectional configuration and includes a first horizontal face and a spaced and parallel second horizontal face, a first vertical face and a spaced and parallel second vertical face, said first vertical face and said second vertical face being of similar length, the ends of said block, when viewed in plan, converging to a common loci lying on the central longitudinal axis of said block, the distance between said common loci being greater than the length of said first and second vertical faces.

11. The invention according to claim 5 in which said side vertically situated block is of substantially rectangular cross sectional configuration and has a first horizontal face and a spaced and parallel second horizontal face, a first vertical face and a substantially spaced and parallel second vertical face, said first vertical face being longer than said second vertical face, the ends of said block angulating inwardly from the ends of said first vertical face to the ends of said second vertical face at different angles to one another.

12. The invention according to claim 11 which includes at least two upper and lower transversely situated blocks, at least one centrally located transversely situated block and at least four side vertically situated blocks.

13. The invention according to claim 10 which includes at least two upper and lower transversely situated blocks, at least one centrally located transversely situated block and at least four side vertically situated blocks.

14. The invention according to claim 1 in which said side vertically situated block is of a substantially rectangular cross sectional configuration and has a first horizontal face and a spaced and parallel second horizontal face, a first vertical face and a substantially spaced and parallel second vertical face, said first vertical face being longer than said second vertical face, the ends of said block angulating inwardly from the ends of said first vertical face to the ends of said second vertical face at different angles to one another.

15. The invention according to claim 14 which includes at least two upper and lower transversely situated blocks, at least one centrally located transversely situated block and at least four side vertically situated blocks.

16. The invention according to claim 1 which includes at least two upper and lower transversely situated blocks, at least one centrally located transversely situated block and at least four side vertically situated blocks.

* * * * *